(12) United States Patent
Xie et al.

(10) Patent No.: US 10,839,244 B2
(45) Date of Patent: Nov. 17, 2020

(54) METHOD AND DEVICE FOR GENERATING IMAGE

(71) Applicant: BAIDU ONLINE NETWORK TECHNOLOGY (BEIJING) CO., LTD., Beijing (CN)

(72) Inventors: Shufu Xie, Beijing (CN); Shanshan Liu, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 210 days.

(21) Appl. No.: 16/109,683

(22) Filed: Aug. 22, 2018

(65) Prior Publication Data

US 2019/0065883 A1 Feb. 28, 2019

(30) Foreign Application Priority Data

Aug. 25, 2017 (CN) .......................... 2017 1 0742645

(51) Int. Cl.
*G06K 9/34* (2006.01)
*G06F 16/951* (2019.01)
(Continued)

(52) U.S. Cl.
CPC ......... *G06K 9/344* (2013.01); *G06F 16/5846* (2019.01); *G06F 16/951* (2019.01);
(Continued)

(58) Field of Classification Search
CPC .. G06K 9/344; G06K 9/348; G06K 2209/011; G06F 16/951; G06F 16/5846; G06F 40/169; G06T 5/003; G06T 5/006
(Continued)

(56) References Cited

U.S. PATENT DOCUMENTS 7,896,253 B2* 3/2011 Chou .................... G06T 3/608
                                                            235/494
2012/0020564 A1 1/2012 Vincent et al.
(Continued)

FOREIGN PATENT DOCUMENTS

CN          103455806          12/2013
CN          103870822          6/2014
(Continued)

OTHER PUBLICATIONS

SIPO, First Office Action for CN Application No. 201710742645.6, dated Apr. 27, 2020.

*Primary Examiner* — Daniel G Mariam
(74) *Attorney, Agent, or Firm* — Hodgson Russ LLP (57) ABSTRACT

The present disclosure provides a method and a device for generating an image. The method includes: a, obtaining a character recognition result corresponding to a first image, the character recognition result including one or more characters and a first confidence of each character; b, determining a second confidence of a character set including at least one of the one or more characters according to the first confidence of each character in the character set; c, determining a refined character set corresponding to the first image based on the second confidence; and d, performing image processing on a sub image corresponding to the refined character set in the first image, to obtain a second image, an annotation text corresponding to the second image including the refined character set.

18 Claims, 3 Drawing Sheets

(51) Int. Cl.
*G06F 16/583* (2019.01)
*G06T 5/00* (2006.01)
*G06F 40/169* (2020.01)

(52) U.S. Cl.
CPC ............ *G06K 9/348* (2013.01); *G06F 40/169* (2020.01); *G06K 2209/011* (2013.01); *G06T 5/003* (2013.01); *G06T 5/006* (2013.01)

(58) Field of Classification Search
USPC ....................................................... 382/185
See application file for complete search history.

(56) References Cited

U.S. PATENT DOCUMENTS

| | | | |
|---|---|---|---|
| 2013/0004077 A1* | 1/2013 | Sun | G06K 9/3208 382/182 |
| 2014/0355835 A1 | 12/2014 | Rodriguez-Serrano et al. | |
| 2018/0189592 A1* | 7/2018 | Annis | G06K 9/46 |

FOREIGN PATENT DOCUMENTS

| | | |
|---|---|---|
| CN | 104965921 | 10/2015 |
| CN | 105095900 | 11/2015 |
| CN | 105184289 | 12/2015 |
| CN | 105975955 | 9/2016 |

\* cited by examiner

METHOD AND DEVICE FOR GENERATING IMAGE

CROSS REFERENCE TO RELATED APPLICATION

This application is based upon and claims priority to Chinese Patent Application No. 201710742645.6, filed on Aug. 25, 2017, the entire contents of which are incorporated herein by reference.

FIELD

The present disclosure relates to a field of image processing, and more particularly to a method for generating an image, and a device for generating an image.

BACKGROUND

With the development of search technologies, search technologies are not limited to base on text. Search technologies based on a combination of image and text are being studied in depth. For example, when a user inputs a keyword, images associated with the keyword may be found based on text tags of the images. However, this manner needs to collect a large number of tags manually, and associate the tags with the images manually, such that the images for search are finite. For massive search, the above manner of finding the images is finite, and inefficient.

Meanwhile, artificial intelligence technology is technical science studying and developing theories, methods, techniques, and application systems for simulating, extending, and expanding human intelligence, which is approved in a plurality of academic fields. It needs to provide a study chance for a search system when the artificial intelligence technology is applied to the search technology. As far as the image search is concerned, it is necessary to provide sufficient images covering a wide range of search fields for search system learning to improve the self-identification ability of the search system. Obviously, this requires extensive collection of sample images manually. For the technician to collect the sample images and associate the tags with the images, it is not an effective way to reduce the work and improve the search accuracy.

SUMMARY

The present disclosure provides a method for generating an image. The method includes: a, obtaining a character recognition result corresponding to a first image, the character recognition result including one or more characters and a first confidence of each character; b, determining a second confidence of a character set including at least one of the one or more characters according to the first confidence of each character in the character set; c, determining a refined character set corresponding to the first image based on the second confidence; and d, performing image processing on a sub image corresponding to the refined character set in the first image, to obtain a second image, an annotation text corresponding to the second image including the refined character set.

The present disclosure further provides a computer readable storage medium having stored computer codes, in which, when the computer codes are executed, any above method is executed.

The present disclosure further provides a computer device, including: one or more processors, and a memory. The memory is configured to store one or more computer programs. The one or more processors are configured to execute the one or more computer programs to implement any above method.

BRIEF DESCRIPTION OF THE DRAWINGS

Other features, objectives and advantages of the present disclosure will become more apparent from the detailed description of the non-restrictive embodiments with reference to the following accompanying drawings.

The same or similar elements are denoted by same or similar reference numerals.

DETAILED DESCRIPTION

Before discussing exemplary embodiments in more detail, it should be noted that some exemplary embodiments are described as processing or methods depicted as flow charts. Although the flow charts describe respective operations as sequential processing, a plurality of operations may be implemented in parallel, concurrently or simultaneously. In addition, orders of the respective operations may be rearranged. The processing may be stopped when the operations are finished, however may further have additional operations that are not included in the accompanying drawings. The processing may correspond to a method, a procedure, a function, a subroutine, a subprogram and the like.

"A computer device" in the context, also known as "computer", is an intelligent electronic device that can perform predetermined processing such as numerical calculations and/or logical calculations by running predetermined programs or instructions. The computer device may include a processor and a memory. The computer device may execute the predetermined processing via the processor by executing pre-stored instructions in the memory, or execute the predetermined processing by hardware such as ASIC (Application Specific Integrated Circuit), FPGA (Field Programmable Gate Array), DSP (Digital Signal Processor), or a combination of the forgoing two. The computer device may include but be not limited to a server, a personal computer, a notebook computer, a table computer, a smart phone and the like.

The computer device may include a user device and a network device. The user device may include but be not limited to a computer, a smart phone, a PDA (Personal Digital Assistant) and the like. The network device may include but be not limited to a singular network server, a group consisted of a plurality of network servers, or a Cloud consisted of a large number of computers or network servers based on Cloud Computing. Cloud Computing is a kind of distributed computing, and is a super virtual computer consisted of a group of loosely coupled computers. The computer device may implement the present disclosure independently, or access the network and implement the present disclosure by interworking with other computer devices in the network. The network where the computer devices are located may include, but be not limited to, Internet, a wide area network, a metropolitan area network, a local area network, a VPN network (Virtual Private Network) and the like.

It should be noted that, the user device, the network device, the network and the like are only exemplary. Other computer devices or networks that exist or possibly appears in the future, may be applicable to the present disclosure, and also should fall within the protection scope of the present disclosure and may be incorporated herein by reference.

Methods (some of which are illustrated by flow charts) discussed below may be implemented by hardware, software, firmware, middleware, microcode, hardware description languages, or any combination thereof. When implemented by software, firmware, middleware or microcode, the program codes or code segments for performing the necessary tasks may be stored in a machine or a computer readable medium (such as a storage medium). The one or more processors may perform the necessary tasks.

Specific structure and functional details disclosed herein are merely representative for purposes of describing exemplary embodiments. The present disclosure may be implemented in many alternative forms and should not be construed as limited to the embodiments set forth herein.

It should be understood that, although terms "first," "second," and the like may be used herein to describe various units, these units should not be limited by these terms. These terms are only used to distinguish one unit from another. For example, without departing from the scope of the present disclosure, a first unit may be termed as a second unit; and similarly, the second unit may also be termed as the first unit. The term "and/or" used herein includes any and all combinations of one or more of the associated listed items.

It should be understood that, when one unit is referred to as "connected" or "coupled" to another unit, it can be directly connected or coupled to the other unit, or an intermediate unit can be present. In contrast, when a unit is referred to as "directly connected" or "directly coupled" to another unit, there is no intermediate unit. Other words used to describe the relationship between the units should be interpreted in a similar manner (such as "between" and "directly between", "adjacent to" and "directly adjacent to").

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should be understood that, when used in the specification, terms "comprising" and/or "containing" specify the presence of stated features, integers, steps, operations, elements and/or components, but do not exclude the presence or addition of one or more other features, integers, steps, operations, elements, components and/or any combination thereof.

It should also be noted that, in some alternative implementations, functions/motions mentioned may occur in an order different from accompanying drawings. As an example, depending on the functions/the motions involved, the two figures shown in succession may in fact be executed substantially or concurrently or in reverse order Since artificial intelligence technology can bring a faster and more accurate search result to the image search, research on extending artificial intelligence technology to search has not stopped. However, how to improve the self-learning ability of the search system such that the search target can be efficiently found in the search process is still a problem to be solved. Therefore, the present disclosure provides a device for generating an image. The device may be an electronic device that may perform digital, data, and logical calculations, including but be not limited to: a personal computer, a server and the like. Therefore, those skilled in the art should understand that the foregoing user device is only for an example, and the user device that exists or possibly appears in the future may be applicable to the present disclosure and should also fall within the protection scope of the present disclosure and may be incorporated herein by reference. Those skilled in the art should also understand that, the user device herein, refers to an intelligent electronic device that can perform predetermined processing such as numerical calculation and/or logical calculation by running predetermined programs or instructions, which may include a processor and a memory. The computer device may execute the predetermined processing via the processor by executing pre-stored instructions in the memory, or execute the predetermined processing by hardware such as ASIC, FPGA, DSP, or a combination of the forgoing two. In order to facilitate data interaction, the device for generating the image further includes external interfaces connected with the processor, such as an USB (Universal Serial Bus) interface, an HDMI (High-Definition Multimedia Interface) interface. The processor may obtain data for generating the image by transmitting data with the external interfaces.

The device for generating the image may, by using one or more characters recognized from a first image, generate a second image related to the one or more characters, and perform text annotation on the second image according to the one or more characters. Therefore, the sample images provided for the search system to learn may be increased.

Figure 1:
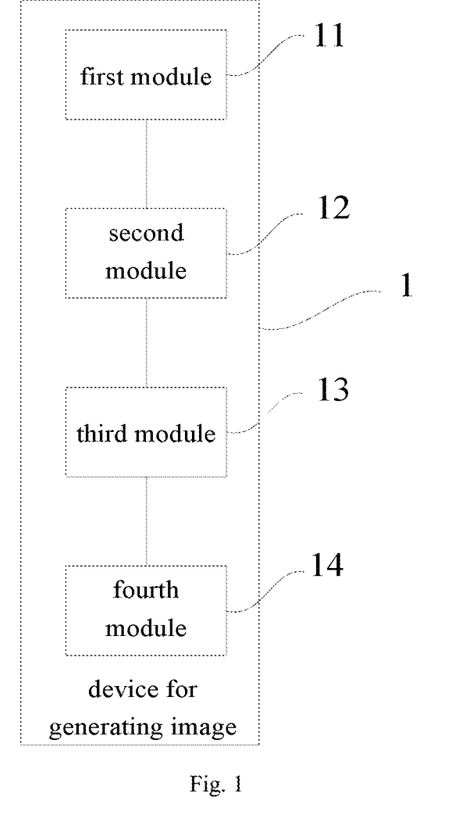
FIG. 1 is a block diagram illustrating a device for generating an image according to an aspect of embodiments of the present disclosure.

FIG. 1 is a block diagram illustrating a device for generating an image according to an aspect of embodiments of the present disclosure. The device for generating the image includes a first module 11, a second module 12, a third module 13 and a forth module 14. Respective modules are configured to work via one or more processors in the device 1 for generating the image invoking computer programs stored in the memory. Each module may configure the one or more processors separately and executing sequence of each module may be managed by other processor. Or each module may be launched or stopped by a common processor.

The first module 11 is configured to obtain a character recognition result corresponding to the first image. The first image may come from images downloaded from network, sample images designed specially, images intercepted from video files, sample images read from the storage medium and the like. The images in the storage medium may include but be not limited to: images saved in a memory of a local device, images saved in an external storage apparatus (such as a U disk, a mobile hard disk) and the like. Formats of the first image may include but be not limited to: .jpg, .png and the like.

In another embodiment, the first module 11 may crawl corresponding webpages on Internet according to a crawling scope specified by a user or a system, and obtain images on the crawled webpages as the first images. The crawling scope may be determined according to at least one of: crawling time, crawling theme, crawling depth, crawling width and the like.

Figure 2:
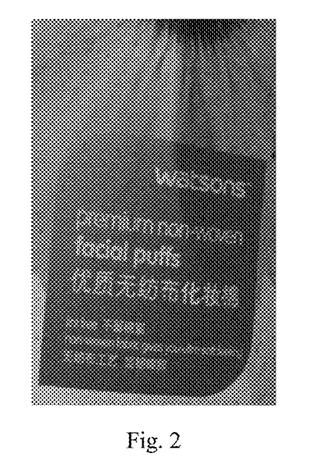
FIG. 2 illustrates contents described in a first image according to a detailed embodiment.

The collected first image, as a basic sample image for generating a second sample image, is pre-processed with image-based text recognition processing to obtain characters in the first image and the character recognition result. The character recognition result may include one or more characters in the first image and a first confidence of each character. For example, FIG. 2 illustrates a detailed embodiment of the first image. In the embodiment, the character recognition result obtained by performing image-based text recognition processing on the image may include: {优,a1}, {质,a2}, {无,a3}, {纺,a4}, {布,a5}, {化,a6}, {妆,a7}, {棉,a8}, {facial,a9}, {puffs,a10}. Chinese character "优" means "superior"; Chinese character "质" means "quality"; Chinese character "无" means "no"; Chinese character "纺" means "woven"; Chinese character "布" means "fabric or cloth"; Chinese characters "化妆棉" mean "cotton pad". In {A, B}, A is a recognized character, B is a first confidence of the recognized character A, and B is a decimal in the interval (0, 1). Apparently, the above format is only configured to describe contents of the character recognition result, but not a unique format of the character recognition result. In addition, the character recognition result may further include area position information of each character in the first image, for example, pixel coordinates of each character in the first images. The character recognition result may further include area position information of each text line, for example, pixel coordinates of each text line in the first image, such as diagonal pixel coordinates of the text line "优质无纺布化妆棉" illustrated in FIG. 2.

The first module 11 may obtain the character recognition result of the first image from a device provided with an image-based text recognition system. For example, an image processing device is connected with the device 1 for generating the image. The image processing device may transmit each obtained first image and the character recognition result of each first image to the first module 11 by data transmission. Thus, the first module 11 may obtain the character recognition result corresponding to the first image.

The device 1 for generating the image may further include an image-based text recognition module. The image-based text recognition module is connected with the first module 11. The image-based text recognition module may transmit each first image and the character recognition result of each first image to the first module 11 by a program interface.

The image-based text recognition technology may provide image data which are easier for recognizing characters by performing grayscale conversion and noise reduction on the image, and then perform character cutting, character recognition and the other character extracting on the image data by using a plurality of image features, such as character features, layout features of the image data, character association. The character may include but be not limited to a Chinese character, a word, a punctuation, a symbol and the like. The corresponding first confidence of the recognized character may be obtained based on manual comparison, comparison of a plurality of character recognition technologies, or feedback mechanism. For example, character cutting technologies with a plurality of different precisions may be employed to recognize a character in the same area in the first image, and the first confidence of the character included in the area is determined according to consistence of each recognition. The image-based text recognition technology may employ OCR (Optical Character Recognition) technology to obtain the character recognition result in each first image.

The first module 11 may combine the one or more characters, the one or more text lines and the like in the obtained character recognition result into a character set and save the character set, such that the second module 12, the third module 13 and the forth module 14 may invoke the character set. The character set may include at least one of the one or more characters. For example, the character set may include each recognized character and/or each recognized text line. In some embodiments, the character set may include at least one of: one text line of the one or more characters; a plurality of text lines of the one or more characters; a part of one text line of the one or more characters; and different text lines of the one or more characters. For example, as illustrated in FIG. 2, the character set may include at least one of: "优质无纺布化妆棉", "优质", "facial puffs", "facial", "puffs" and "化妆棉 lint free 不留棉絮".

The second module 12 is configured to determine a second confidence of the character set according to the first confidence of each character in the character set.

When the character set includes one character, the first confidence of the one character is the second confidence of the character set. When the character set includes a plurality of characters, and/or at least one text line, the second module 12 may determine the second confidence of the character set according to the first confidence of each character included in the character set. For example, the character set obtained based on FIG. 2 includes the text line "优质无纺布化妆棉". The second confidence of the character set is determined based on the first confidence of each character "优", "质", "无", "纺", "布", "化", "妆", and "棉". As another example, the character set includes "优质", and "无纺布", the second confidence of the character set is determined based on the first confidence of each character "优", "质", "无", "纺", and "布".

A way that the second module 12 determines the second confidence of the character set according to the first confidence of each character in the character set may include but be not limited to: 1) taking a minimum one of the first confidence of each character in the character set as the second confidence of the character set; 2) taking an average value of the first confidence of each character in the character set as the second confidence of the character set; 3) culling a minimum first confidence and a maximum first confidence from the character set, and taking an average value of the remaining first confidence of each character as the second confidence of the character set.

In another embodiment, a way that the second module 12 determines the second confidence of the character set according to the first confidence of each character in the character set may further include: taking a weighting or a weighting average of the first confidence of each character in the character set as the second confidence of the character set. The weight may be obtained based on a preset way, or, alternatively, weight information corresponding to the first confidence of the character may be determined according to a position corresponding to the character.

In detail, importance information of the character in the whole text line or in the whole image is determined according to a position of the character in the whole text line and/or in the whole image, thus the weight information corresponding to the first confidence of the character is determined.

For example, when a certain character is in a center position of the whole text line or the whole image, the character is most important than other characters. Therefore, the weight information of the first confidence corresponding to this character is set to be higher; when a certain character is in the ending of the whole text line or a corner position of the whole image, the character is less important than other characters, and the weight information of the first confidence corresponding to this character is set to be lower.

It should be noted that, it is only an example by employing the way of determining the second confidence of the character set according to the minimum value of the first confidence of each character in the character set, the average value of the first confidence of each character in the character set or the like. In fact, any way which is reasonable, and helpful to more accurately determine the second confidence of the character set should be seen as detailed embodiments of determining the second confidence of the character set in the present disclosure.

The third module 13 is configured to determine a refined character set corresponding to the first image based on the second confidence.

In some embodiments, the third module 13 may extract the second confidence of each character set, and compare each second confidence with a preset set confidence threshold. The character set corresponding to the second confidence higher than or equal to the set confidence threshold is retained, and the retained character set is determined as the refined character set of the first image. The set confidence threshold may be a fixed value; or a threshold value that does not meet a preset statistical percentage in respective second confidences is determined as the set confidence threshold.

In another embodiments, the third module 13 may sort a plurality of character sets in a descending order of the second confidence; and determines the first N character sets in the order as refined character sets corresponding to the first image. N is a natural number. N may further be a fixed value, or a value set based on a sum number of the second confidences.

For example, if N is the fixed value, when the amount of the obtained second confidences is greater than N, the character sets corresponding to the first N second confidences in the descending order are selected as the refined character sets of the first image. When the amount of the obtained second confidences is lower than N, the third module 13 may recognize that the first image may not be as the sample image, or the third module 13 may adjust N, such that the first image has at least one refined character set.

As another example, a sum of the second confidences is 10, and the greater first 90% of the second confidences are taken as a filtering condition, to obtain that N is 9. The character sets corresponding to the first 9 second confidences in the descending order are retained. The character set corresponding to a minimum second confidence is removed. 9 retained character sets are taken as the refined character sets of the first image. The obtained refined character sets are transmitted to the fourth module 14.

In another embodiment, the third module 13 screens the character sets first, and then the refined character sets corresponding to the first image are determined based on the second confidences of the character sets after screening. The screening may include but be not limited to: screening based on a character type, such as Chinese character sets, English character sets or mixed character sets are selected; or based on positions of the character sets, such as character sets in special positions (such as a center of the image) in the whole image are selected.

In another embodiment, the third module 13 may, according to the second confidence and by combining with application related information of an application corresponding to the second image, determine the refined character set corresponding to the first image.

In detail, the third module 13 may directly interact with the application corresponding to the second image by an application interface, to obtain the application related information of the application; or the third module 13 may interact with other devices, to obtain the application related information of the application corresponding to the second image provided by other devices.

The application related information may include but be not limited to application types, application fields, application image setting and the like.

The third module 13 may determine the set confidence threshold based on the application related information, and compare each second confidence with the set confidence threshold. The character set corresponding to the second confidence higher than or equal to the set confidence threshold is retained, and the retained character set is determined as the refined character set of the first image.

For example, when the application field is an academic image recognition, the set confidence threshold is set to be higher; when the application field is a non-academic image recognition, the set confidence threshold is set to be lower. When the application type is an office application, the set confidence threshold is set to be higher; when the application type is an entertainment application, the set confidence threshold is set to be lower.

The fourth module 14 is configured to perform image processing on a sub image corresponding to the refined character set in the first image, to obtain a second image. An annotation text corresponding to the second image includes the refined character set.

Figure 3:
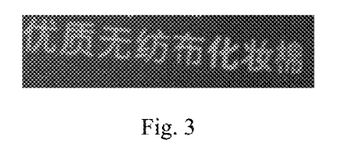
FIG. 3 is a schematic diagram illustrating a sub image obtained from a first image illustrated in FIG. 2 based on area position information of a text line in a character recognition result.
Figure 4:
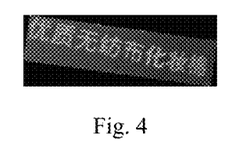
FIG. 4-8 are schematic diagrams illustrating each sub image obtained by performing an image angle rotation processing, an image blur processing, an image color reversing processing, an image zooming processing or superposing check noise on a sub image illustrated in FIG. 3.
Figure 5:
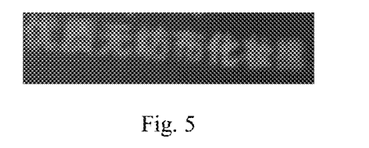

In some embodiments, the fourth module 14 may determine the sub image corresponding to the refined character set in the first image according to area position information of the one or more characters in the refined character set. With the area position information of each character or each text line of the determined refined character set in the character recognition result, an image that includes the corresponding character set is extracted from the first image, and the extracted image is taken as the sub image corresponding to the refined character set. For example, in FIG. 2, the refined character set determined by the third module 13 includes the text line "优质无纺布化 妆棉". The fourth module 14 may extract an image from the first image illustrated in FIG. 2 based on area position information of the text line in the obtained character recognition result, to obtain the sub image illustrated in FIG. 3.

Base on the above examples, when there are a plurality of refined character sets, the fourth module 14 may select at least one sub image corresponding to at least one refined character set selected from the plurality of character sets in the first image. In a detailed example, the fourth module 14 may combine the at least one refined character set according to need of the amount of the sample images of each refined character set, and extract the sub image from the first image according to area position information of the one or more characters in the refined character set after combining. For example, the two refined character sets corresponding to FIG. 2 include: "优质无纺布化妆棉" and "facial puffs". The fourth module 14 may extract three images, in which the first one include the character set "优质无纺布化妆棉", the second one include "facial puffs", and the third one include the character sets "优质无纺布化妆棉" and "facial puffs".

The fourth module 14 may perform at least one image processing on each obtained sub image. The image processing may include but be not limited to at least one of: an image angle rotation processing; an image blur processing; an image color reversing processing; an image zooming processing; and superposing check noise in the image. As illustrated in FIG. 4-8, the sub image that displays to include the text line "优质无纺布化妆棉" is respectively obtained after each above image processing. The sub image after the image processing may be taken as the second image, in which, the annotation text corresponding to the second image includes the refined character set. After the second image and the first image are annotated with the defined character set, the second image and the first image may be taken as the sample images for artificial intelligence learning by the search system.

Figure 6:
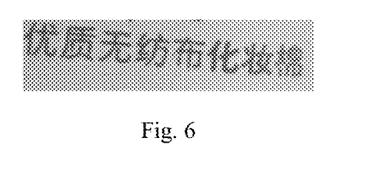
Figure 7:
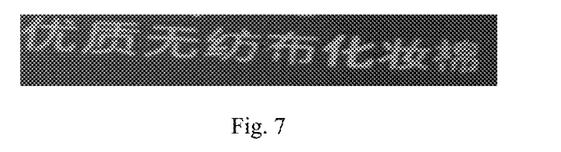
Figure 8:
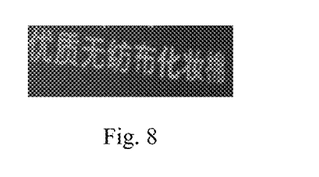

In another embodiment, the fourth module 14 may replace corresponding area in the first image with the sub image after the image processing, to obtain the second image, and set the corresponding annotation text of the second image according to the refined character set corresponding to the sub image. For example, according to the area position information of the character set "优质无纺布化妆棉", the sub image after an image color reversing processing in FIG. 6 is used to replace the area that includes the text line "优质无纺布化妆棉" in the first image, to obtain the second image, and the text line "优质无纺布化妆棉" is set as the annotation character of the second image.

In another embodiment, when preforming the text recognition on the first image, the first module 11 may perform singular character recognition and a combination character recognition on the first image. In other word, the first module 11 may recognize each character on the first image based on OCR technology, and give a position and a confidence of each character, and then take each character, the character position and the confidence of each character as the first character recognition result; and then the first module 11 alternatively performs neighboring-character recognition on the first image based on OCR technology, and give a character position and a confidence of each of two or more neighboring characters, and take each of two or more neighboring characters, the character position and the confidence of each of two or more neighboring characters as a second character recognition result.

Then, the first module 11 takes the above first character recognition result and the above second character recognition result as the character recognition result of the first image.

Taking English characters as an example, when a word is set as a unit of the characters, a singular character is a word, and a combination character is a combination of words; when a grapheme is set as a unit of the characters, a singular character is a grapheme, and a combination character is a plurality of graphemes or words. Taking Chinese characters as an example, when a Chinese character is set as a unit of the characters, a singular character is a Chinese character, and a combination character is a combination of a plurality of Chinese characters. When there are an English character, a Chinese character and a mixture of other characters, based on the units of the characters set by different character types, the plurality of characters are combined together to be taken as the combination character.

The second character recognition result may include "a second character recognition result corresponding to two neighboring characters", "a second character recognition result corresponding to three neighboring characters" and/or "a second character recognition result corresponding to N neighboring characters"; the first module 11 may simultaneously calculate the first character recognition result corresponding to the singular character and the second character recognition result corresponding to the two or more characters; or the first module 11 may calculate the first character recognition result firstly, and then calculate the second character recognition result corresponding to "the two neighboring characters", and then second character recognition result corresponding to "the three neighboring characters", ..., second character recognition result corresponding to "the N neighboring characters" sequentially.

For example, when taking an English character as the unit of the characters, recognition is performed on the characters "one". When recognition is performed on each character, "o" in "one" may be recognized to "0", and the confidence is set to 0.9; when "o" is recognized together with "ne", the confidence of recognized "One" is 0.5—thus it may be known that "0" may not be accurate. When recognition is performed on each character, "o" in "one" may be recognized to "o", and the confidence is set to 0.9; when "o" is recognized together with "ne", and the confidence is set to 0.9; when "o" is recognized together with "ne", the confidence of recognized "one" is 0.9—thus it may be known that "o" has a strong accuracy.

In another embodiment, the second module includes a two-one unit (not illustrated in FIGS.) and a two-two unit (not illustrated in FIGS.).

The two-one unit determines whether characters corresponding to the same character position are consistent in the first character recognition result and the second character recognition result according to a character position in the character recognition result. Those skilled in the art should understand that, there may be a plurality of the second character recognition results, for example, one second character recognition result corresponding to the two neighboring characters, another second character recognition result corresponding to the three neighboring characters, and the like; the two-two unit may compare the characters corresponding to the same character position in the plurality of character recognition results with each other, to determine whether the characters corresponding to the same position are consistent with each other.

The two-two unit determines the weight corresponding to the confidence corresponding to the character according to whether, determined by the two-one unit, the characters corresponding to the same character position are consistent and based on the confidence in the first character recognition result and the confidence in the second character recognition result, and then determines the second confidence of the character set. For example, when it is not consistent, the weight corresponding to the character is decreased (the minimum is 0); when it is consistent, the weight corresponding to the character is increased (such as the weight is greater than 1).

In another embodiment, when the characters corresponding to the same character position are consistent, the two-two unit may calculate the second confidence in the first character recognition result in the character set and the second confidence in the second character recognition result in the character set based on each confidence included in the first character recognition result and each confidence included in the second character recognition result, and then determine the second confidence of the first image by an average value or a minimum value of the two second confidences.

In another embodiment, when the characters corresponding to the same character position are not consistent, the two-two unit sets the second confidence of the character set to zero. The character set includes at least one of the one or more characters.

Namely, when the characters corresponding to the same character position are not consistent, the second confidence of the character set corresponding to the character position is directly set to 0.

Figure 9:
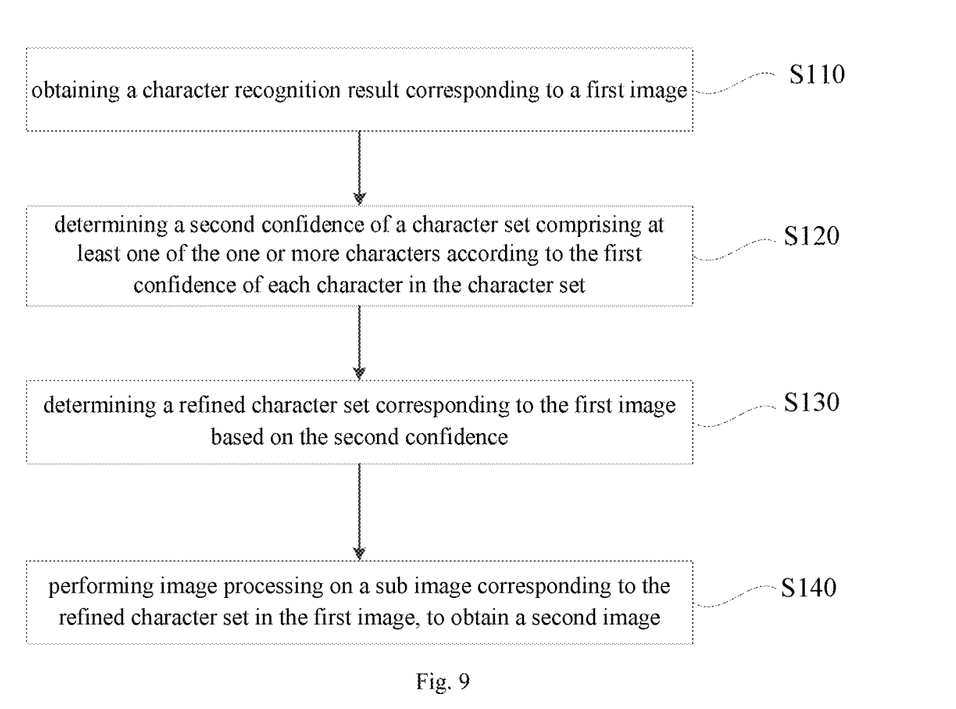
FIG. 9 is a flow chart illustrating a method for generating an image according to an aspect of embodiments of the present disclosure.

FIG. 9 is a flow chart illustrating a method for generating an image according to an aspect of embodiments of the present disclosure. The method for generating the image is executed mainly by the device for generating the image. The device for generating the image may include but be not limited to a personal computer, a server and the like.

In block S110, a character recognition result corresponding to the first image is obtained. In detail, in block S110, the device for generating the image may obtain the first image from images downloaded from network, sample images designed specially, images intercepted from video files, sample images read from the storage medium and the like. The images in the storage medium may include but be not limited to: images saved in a memory of a local device, images saved in an external storage apparatus (such as a U disk, a mobile hard disk) and the like. Formats of the first image may include but be not limited to: .jpg, .png and the like.

In another embodiment, in block 11, the device for generating the image may crawl corresponding webpages on Internet according to a crawling scope specified by a user or a system, and obtain images on the crawled webpages as the first images. The crawling scope may be determined according to at least one of: crawling time, crawling theme, crawling depth, crawling width and the like.

The collected first image, as a basic sample image for generating a second sample image, is pre-processed with image-based text recognition processing to obtain characters in the first image and the character recognition result. The character recognition result may include one or more characters in the first image and a first confidence of each character. For example, FIG. 2 illustrates a detailed embodiment of the first image. In the embodiment, the character recognition result obtained by performing image-based text recognition processing on the image may include: {优,a1}, {质,a2}, {无,a3}, {纺,a4}, {布,a5}, {化,a6}, {妆,a7}, {棉,a8}, {facial,a9}, {puffs,a10}. Chinese character "优" means "superior"; Chinese character "质" means "quality"; Chinese character "无" means "no"; Chinese character "纺" means "woven"; Chinese character "布" means "fabric or cloth"; Chinese characters "化妆棉" mean "cotton pad". In {A, B}, A is a recognized character, B is a first confidence of the recognized character A, and B is a decimal in the interval (0, 1). Apparently, the above format is only configured to describe contents of the character recognition result, but not a unique format of the character recognition result. In addition, the character recognition result may further include area position information of each character in the first image, for example, pixel coordinates of each character in the first images. The character recognition result may further include area position information of each text line, for example, pixel coordinates of each text line in the first image, such as diagonal pixel coordinates of the text line "优质无纺布化妆棉" illustrated in FIG. 2.

The device for generating the image may obtain the character recognition result of the first image from the device provided with an image-based text recognition system. For example, an image processing device is connected with the device for generating the image. The image processing device may transmit each obtained first image and the character recognition result of each first image to the device for generating the image by data transmission. Thus, the device for generating the image may obtain the character recognition result corresponding to the first image.

The device for generating the image may further include an image-based text recognition module. The image-based text recognition module is connected with the device for generating the image. The image-based text recognition module may transmit each first image and the character recognition results of each first image to the device for generating the image by a program interface.

The image-based text recognition technology may provide image data which are easier for recognizing characters by performing grayscale conversion and noise reduction on the image, and then perform character cutting, character recognition and the other character extracting on the image data by using a plurality of image features, such as character features, layout features of the image data, character association. The character may include but be not limited to a Chinese character, a word, a punctuation, a symbol and the like. The corresponding first confidence of the recognized character may be obtained based on manual comparison, comparison of a plurality of character recognition technologies, or feedback mechanism. For example, character cutting technologies with a plurality of different precisions may be employed to recognize a character in the same area in the first image, and the first confidence of the character included in the area is determined according to consistence of each recognition. The image-based text recognition technology may employ OCR (Optical Character Recognition) technology to obtain the character recognition result in each first image.

The device for generating the image may combine the one or more characters, the one or more text lines and the like in the obtained character recognition result into a character set and save the character set, such that the second module, the third module and the forth module may invoke the character set. The character set may include at least one of the one or more characters. For example, the character set may include each recognized character and/or each recognized text line. In some embodiments, the character set may include at least one of: one text line of the one or more characters; a plurality of text lines of the one or more characters; a part of one text line of the one or more characters; and different text lines of the one or more characters. For example, as illustrated in FIG. 2, the character set may include at least one of: "优质无纺布化妆棉", "优质", "facial puffs", "facial", "puffs" and "化妆棉 a lint free 不留棉絮".

In block S120, a second confidence of the character set is determined according to the first confidence of each character in the character set When the character set includes one character, the first confidence of the one character is the second confidence of the character set. When the character set includes a plurality of characters, and/or at least one text line, the device for generating the image may determine the second confidence of the character set according to the first confidence of each character included in the character set. For example, the character set includes the character line "优质无纺布化妆棉". The second confidence of the character set is determined based on the first confidence of each character "优", "质", "无", "纺", "布", "化", "妆", and "棉". As another example, the character set includes "优质", and "无纺布", then the second confidence of the character set is determined based on the first confidence of each character "优", "质", "无", "纺", and "棉".

A way that the device for generating the image determines the second confidence of the character set according to the first confidence of each character in the character set may include but be not limited to: 1) taking a minimum one of the first confidence of each character in the character set as the second confidence of the character set; 2) taking an average value of the first confidence of each character in the character set as the second confidence of the character set; 3) culling a minimum first confidence and a maximum first confidence from the character set, and taking an average value of the remaining first confidence of each character as the second confidence of the character set.

In another embodiment, in block S120, a way that the device for generating the image determines the second confidence of the character set according to the first confidence of each character in the character set may further include: taking a weighting or a weighting average of the first confidence of each character in the character set as the second confidence of the character set. The weight may be obtained based on a preset way, or, alternatively, weight information corresponding to the first confidence of the character may be determined according to a position corresponding to the character.

In detail, importance information of the character in the whole text line or in the whole image is determined according to a position of the character in the whole text line and/or in the whole image, thus the weight information corresponding to the first confidence of the character is determined.

For example, when a certain character is in a center position of the whole text line or the whole image, the character is most important than other characters. Therefore, the weight information of the first confidence corresponding to this character is set to be higher; when a certain character is in the ending of the whole text line or a corner position of the whole image, the character is less important than other characters, and the weight information of the first confidence corresponding to this character is set to be lower.

It should be noted that, it is only an example by employing the way of determining the second confidence of the character set according to the minimum value of the first confidence of each character in the character set, the average value of the first confidence of each character in the character set or the like. In fact, any way which is reasonable, and helpful to more accurately determine the second confidence of the character set should be seen as detailed embodiments of determining the second confidence of the character set in the present disclosure.

In block S130, a refined character set is determined corresponding to the first image based on the second confidence.

In some embodiments, the device for generating the image may extract the second confidence of each character set, and compare each second confidence with a preset set confidence threshold. The character set corresponding to the second confidence higher than or equal to the set confidence threshold is retained, and the retained character set is determined as the refined character set of the first image. The set confidence threshold may be a fixed value; or a threshold value that does not meet a preset statistical percentage in respective second confidences is determined as the set confidence threshold.

In another embodiment, the device for generating the image may sort a plurality of character sets in a descending order of the second confidence; and determines the first N character sets in the order as refined character sets corresponding to the first image. N is a natural number. N may further be a fixed value, or a value set based on a sum number of the second confidences.

For example, if N is the fixed value, when the amount of the obtained second confidences is greater than N, the character sets corresponding to the first N second confidences in the descending order are selected as the refined character sets of the first image. When the amount of the obtained second confidences is lower than N, the device for generating the image may recognize that the first image may not be as the sample image, or the device for generating the image may adjust N, such that the first image has at least one refined character set.

As another example, a sum of the second confidences is 10, and the greater first 90% of the second confidences are taken as a filtering condition, to obtain that N is 9. The character sets corresponding to the first 9 second confidences in the descending order are retained. The character set corresponding to a minimum second confidence is removed. 9 retained character sets are taken as the refined character sets of the first image.

In another embodiment, in block S130, the device for generating the image screens the character sets first, and then the refined character sets corresponding to the first image are determined based on the second confidences of the character sets after screening. The screening may include but be not limited to: screening based on a character type, such as Chinese character sets, English character sets or mixed character sets are selected; or based on positions of the character sets, such as character sets in special positions (such as a center of the image) in the whole image are selected.

In another embodiment, in block S130, the device for generating the image may, according to the second confidence and by combining with application related information of an application corresponding to the second image, determine the refined character set corresponding to the first image.

In detail, the device for generating the image may directly interact with the application corresponding to the second image by an application interface, to obtain the application related information of the application; or the device for generating the image may interact with other devices, to obtain the application related information of the application corresponding to the second image provided by other devices.

The application related information may include but be not limited to application types, application fields, application image setting and the like.

The device for generating the image may determine the set confidence threshold based on the application related information, and compare each second confidence with the set confidence threshold. The character set corresponding to the second confidence higher than or equal to the set confidence threshold is retained, and the retained character set is determined as the refined character set of the first image.

For example, when the application field is an academic image recognition, the set confidence threshold is set to be higher; when the application field is a non-academic image recognition, the set confidence threshold is set to be lower. When the application type is an office application, the set confidence threshold is set to be higher; when the application type is an entertainment application, the set confidence threshold is set to be lower.

In block S140, image processing is performed on a sub image corresponding to the refined character set in the first image, to obtain a second image. An annotation text corresponding to the second image includes the refined character set.

In some embodiments, the device for generating the image may determine the sub image corresponding to the refined character set in the first image according to area position information of the one or more characters in the refined character set. With the area position information of each character or each text line of the determined refined character set in the character recognition result, an image that includes the corresponding character set is extracted from the first image, and the extracted image is taken as the sub image corresponding to the refined character set. For example, in FIG. 2, the refined character set determined by the device for generating the image includes the text line " 优质无纺布化妆棉 ". The device for generating the image may extract an image from the first image illustrated in FIG. 2 based on area position information of the text line in the obtained character recognition result, to obtain the sub image illustrated in FIG. 3.

Base on the above examples, when there are a plurality of refined character sets, the device for generating the image may select at least one sub image corresponding to at least one refined character set selected from the plurality of character sets in the first image. In a detailed example, The device for generating the image may combine the at least one refined character set according to need of the amount of the sample images of each refined character set, and extract the sub image from the first image according to area position information of the one or more characters in the refined character set after combining. For example, the two refined character sets corresponding to FIG. 2 include: " 优质无纺布化妆棉 " and "facial puffs". The device for generating the image may extract three images, in which the first one include the character set "优质无纺布化妆棉", the second one include "facial puffs", and the third one include the character sets "'优质无纺布化妆 棉 " and "facial puffs".

The device for generating the image may perform at least one image processing on each obtained sub image. The image processing may include but be not limited to at least one of: an image angle rotation processing; an image blur processing; an image color reversing processing; an image zooming processing; and superposing check noise in the image. As illustrated in FIG. 4-8, the sub image that displays to include the text line "优质无纺布化妆棉 " is respectively obtained after each above image processing. The sub image after the image processing may be taken as the second image, in which the annotation text corresponding to the second image includes the refined character set. After the second image and the first image are annotated with the defined character set, the second image and the first image may be taken as the sample images for artificial intelligence learning by the search system.

In another embodiment, the device for generating the image may replace corresponding area in the first image with the sub image after the image processing, to obtain the second image, and set the corresponding annotation text of the second image according to the refined character set corresponding to the sub image. For example, according to the area position information of the character set " 优质无纺布化妆棉 ", the sub image after an image color reversing processing in FIG. 6 is used to replace the area that includes the text line "优质无纺化妆棉 " in the first image, to obtain the second image, and the text line " 优质无纺布化妆棉 " is set as the annotation character of the second image.

In another embodiment, when performing the text recognition on the first image, the device for generating the image may perform singular character recognition and a combination character recognition on the first image. In other word, the device for generating the image may recognize each character on the first image based on OCR technology, and give a position and a confidence of each character, and then take each character, the character position and the confidence of each character as the first character recognition result; then the device for generating the image alternatively performs neighboring-character recognition on the first image based on OCR technology, and give a character position and a confidence of each of two or more neighboring characters, and take each of two or more neighboring characters, the character position and the confidence of each of two or more neighboring characters as a second character recognition result.

Then, the device for generating the image takes the above first character recognition result and the above second character recognition result as the character recognition result of the first image.

Taking English characters as an example, when a word is set as a unit of the characters, a singular character is a word, and a combination character is a combination of words; when a grapheme is set as a unit of the characters, a singular character is a grapheme, and a combination character is a plurality of graphemes or words. Taking Chinese characters as an example, when a Chinese character is set as a unit of the characters, a singular character is a Chinese character, and a combination character is a combination of a plurality of Chinese characters. When there are an English character, a Chinese character and other characters, based on the units of the characters set by different character types, the plurality of characters are combined together to be taken as the combination character.

The second character recognition result may include "a second character recognition result corresponding to two neighboring characters", "a second character recognition result corresponding to three neighboring characters" and/or "a second character recognition result corresponding to N neighboring characters"; the device for generating the image may simultaneously calculate the first character recognition result corresponding to the singular character and the second character recognition result corresponding to the two or more characters; or the device for generating the image may calculate the first character recognition result firstly, and then calculate the second character recognition result corresponding to "the two neighboring characters", and then the second character recognition result corresponding to "the three neighboring characters", . . . , the second character recognition result corresponding to "the N neighboring characters" sequentially.

For example, when taking an English character as the unit of the characters, recognition is performed on the characters "one". When recognition is performed on each character, "o" in "one" may be recognized to "0", and the confidence is set to 0.9; when "0" is recognized together with "ne", the confidence of recognized "One" is 0.5—thus it may be known that "0" may not be accurate. When recognition is performed on each character, "o" in "one" may be recognized to "o", and the confidence is set to 0.9; when "o" is recognized together with "ne", and the confidence is set to 0.9; when "o" is recognized together with "ne", the confidence of recognized "one" is 0.9—thus it may be known that "o" has a strong accuracy.

In another embodiment, the device for generating the image determines whether characters corresponding to the same character position are consistent in the first character recognition result and the second character recognition result according to a character position in the character recognition result. Those skilled in the art should understand that, there may be a plurality of the second character recognition results, for example, one second character recognition result corresponding to the two neighboring characters, another second character recognition result corresponding to the three neighboring characters, and the like; the device for generating the image may compare the characters corresponding to the same character position in the plurality of character recognition results with each other, to determine whether the characters corresponding to the same position are consistent with each other.

The device for generating the image determines the weight corresponding to the confidence corresponding to the character according to whether the characters corresponding to the same character position are consistent and based on the confidence in the first character recognition result and the confidence in the second character recognition result, and then determines the second confidence of the character set. For example, when it is not consistent, the weight corresponding to the character is decreased (the minimum is 0); when it is consistent, the weight corresponding to the character is increased (such as the weight is greater than 1).

In another embodiment, when the characters corresponding to the same character position are consistent, the device for generating the image may calculate the second confidence in the first character recognition result in the character set and the second confidence in the second character recognition result in the character set based on each confidence included in the first character recognition result and each confidence included in the second character recognition result, and then determine the second confidence of the first image by an average value or a minimum value of the two second confidences.

In another embodiment, when the characters corresponding to the same character position are not consistent, the device for generating the image sets the second confidence of the character set to zero. The character set includes at least one of the one or more characters.

Namely, when the characters corresponding to the same character position are not consistent, the second confidence of the character set corresponding to the character position is directly set to 0.

The present disclosure further provides a computer readable storage medium having stored computer codes. When the computer codes are executed, any above method is executed.

The present disclosure further provides a computer program product. When the computer program product is executed by a computer device, any above method is executed.

The present disclosure further provides a computer device. The computer device includes: one or more processors and a memory.

The memory is configured to store one or more computer programs.

The one or more processors are configured to execute the one or more computer programs to implement any above method.

It should be noted that the present disclosure can be implemented in software and/or a combination of software and hardware, for example, an application specific integrated circuit (ASIC), a general purpose computer, or any other similar hardware device. In an embodiment, the software programs of the present disclosure can be executed by a processor to implement the steps or functions described above. Likewise, the software programs (including related data structures) of the present application can be stored in a computer readable recording medium such as a random access memory (RAM), a magnetic or optical drive or a floppy disk and the like. In addition, some of the steps or functions of the present disclosure may be implemented in hardware, for example, a circuit that cooperates with a processor to perform various steps or functions.

In addition, a portion of the present disclosure can be applied as a computer program product, such as computer program instructions. When the computer program product is executed by a computer, a method and/or technical solution in accordance with the present application may be invoked or provided. The program instructions that invoke the method of the present disclosure may be stored in a fixed or removable recording medium, and/or transmitted by a data stream in a broadcast or other signal bearing medium, and/or stored in a working memory of the computer device in which the program instructions are run. An embodiment of the present disclosure includes a device including a memory for storing computer program instructions and a processor for executing program instructions, in which when the computer program instructions are executed by the processor, the device operates based on the aforementioned methods and/or technical solutions in accordance with various embodiments of the present disclosure are triggered.

For those skilled in the art, it is apparent that the present disclosure is not limited to the details of the above-described exemplary embodiments, and the present disclosure can be implemented in other specific forms without departing from the spirit or essential characteristics of the present disclosure. Therefore, the present embodiments are to be considered as illustrative and not restrictive, and the scope of the present disclosure is defined by the appended claims instead the above description. The purpose of the present disclosure is therefore to include all changes in the meaning and scope of the equivalence of the claims. Any reference signs in the claims should not be construed as limitation on the claims. In addition, it is obvious that the word "comprising" does not exclude other elements or steps, and the singular does not exclude the plural. A plurality of units or devices recited in the device claims may also be implemented by a unit or device via software or hardware. The first, the second and other wording denote names, and do not represent any particular order.

What is claimed is:

1. A computer-implemented method for generating an image, comprising:

a, obtaining, by one or more computing devices, a character recognition result corresponding to a first image, the character recognition result comprising one or more characters and a first confidence of each character;

b, determining, by the one or more computing devices, a second confidence of a character set comprising at least one of the one or more characters according to the first confidence of each character in the character set;

c, determining, by the one or more computing devices, a refined character set corresponding to the first image based on the second confidence; and d, performing, by the one or more computing devices, image processing on a sub image corresponding to the refined character set in the first image, to obtain a second image, and annotating the second image with an annotation text comprising the refined character set;

wherein, act c comprises:

sorting, by the one or more computing devices, a plurality of character sets in a descending order of the second confidence; and determining, by the one or more computing devices, the first N character sets in the order as refined character sets corresponding to the first image, N being a natural number.

2. The method according to claim 1, wherein, act d comprises:

determining, by the one or more computing devices, the sub image corresponding to the refined character set in the first image according to area position information of the one or more characters in the refined character set; and performing, by the one or more computing devices, the image processing on the sub image, to obtain the second image, the annotation text corresponding to the second image comprising the refined character set.

3. The method according to claim 2, wherein, the character recognition result further comprises the area position information.

4. The method according to claim 1, wherein, act c comprises:

determining, by the one or more computing devices, the character set as the refined character set corresponding to the first image when the second confidence is equal to or greater than a set confidence threshold.

5. The method according to claim 1, wherein, the character set comprises at least one of:
one text line of the one or more characters;
a plurality of text lines of the one or more characters;
a part of one text line of the one or more characters; and
different text lines of the one or more characters.

6. The method according to claim 1, wherein, act d comprises:

performing, by the one or more computing devices, different image processing on the sub image corresponding to the refined character set in the first image, to obtain a plurality of second images, the annotation text corresponding to each second image comprising the refined character set.

7. The method according to claim 1, wherein, act d comprises:

performing, by the one or more computing devices, the image processing on the sub image corresponding to at least one of a plurality of refined character sets in the first image in responding to existing the plurality of refined character sets, to obtain the second image, the annotation text corresponding to the second image comprising the refined character set.

8. The method according to claim 1, wherein, the image processing comprises at least one of:
an image angle rotation processing;
an image blur processing;
an image color reversing processing;
an image zooming processing; and
superposing check noise in the image.

9. The method according to claim 1, wherein, act c comprises:

perform, by the one or more computing devices, character recognition on the first image, to obtain a first character recognition result of the first image, the first character recognition result comprising the one or more characters, a character position of each character and the first confidence of each character; and performing, by the one or more computing devices, combining recognition on two or more neighboring characters in the first image to obtain a second character recognition result of the first image, the second character recognition result comprising the two or more neighboring characters, a character position of the two or more neighboring characters and a confidence corresponding to the two or more neighboring characters;

obtaining, by the one or more computing devices, the character recognition result corresponding to the first image, the character recognition result comprising the first character recognition result and the second character recognition result.

10. The method according to claim 9, wherein, act b comprises:

determining, by the one or more computing devices, whether characters corresponding to the same character position are consistent in the first character recognition result and the second character recognition result;

b1, determining, by the one or more computing devices, the second confidence of the character set according to whether the characters corresponding to the same character position are consistent and by combining the confidences of each character in the character set in the first character recognition result and the second character recognition result, the character set comprising at least one of the one or more characters.

11. The method according to claim 10, wherein, act b1 comprises:

determining, by the one or more computing devices, the second confidence of the character set by combining the confidences of each character in the character set in the first character recognition result and the second character recognition result, when the characters corresponding to the same character position are consistent, the character set comprising at least one of the one or more characters.

12. The method according to claim 10, wherein, act b1 comprises:

setting, by the one or more computing devices, the second confidence of the character set to zero when the characters corresponding to the same character position are not consistent, the character set comprising at least one of the one or more characters.

13. A non-transitory computer-readable storage medium having stored computer codes, wherein when the computer codes are executed, a method is executed, the method comprising:

a, obtaining a character recognition result corresponding to a first image, the character recognition result comprising one or more characters and a first confidence of each character;

b, determining a second confidence of a character set comprising at least one of the one or more characters according to the first confidence of each character in the character set;

c, determining a refined character set corresponding to the first image based on the second confidence; and d, performing image processing on a sub image corresponding to the refined character set in the first image, to obtain a second image, and annotating the second image with an annotation text comprising the refined character set;

wherein, act c comprises:

sorting a plurality of character sets in a descending order of the second confidence; and determining the first N character sets in the order as refined character sets corresponding to the first image, N being a natural number.

14. The computer-readable storage medium according to claim 13, wherein, act d comprises:

determining the sub image corresponding to the refined character set in the first image according to area position information of the one or more characters in the refined character set; and performing the image processing on the sub image, to obtain the second image, the annotation text corresponding to the second image comprising the refined character set.

15. The computer-readable storage medium according to claim 13, wherein, act c comprises:

determining the character set as the refined character set corresponding to the first image when the second confidence is equal to or greater than a set confidence threshold.

16. The computer-readable storage medium according to claim 13, wherein, act d comprises:

performing different image processing on the sub image corresponding to the refined character set in the first image, to obtain a plurality of second images, the annotation text corresponding to each second image comprising the refined character set.

17. The computer-readable storage medium according to claim 13, wherein, act d comprises:

performing the image processing on the sub image corresponding to at least one of a plurality of refined character sets in the first image in responding to existing the plurality of refined character sets, to obtain the second image, the annotation text corresponding to the second image comprising the refined character set.

18. A computer device, comprising:

one or more processors;

a memory, configured to store one or more computer programs;

wherein the one or more processors are configured to execute the one or more computer programs to implement acts of:

a, obtaining a character recognition result corresponding to a first image, the character recognition result comprising one or more characters and a first confidence of each character;

b, determining a second confidence of a character set comprising at least one of the one or more characters according to the first confidence of each character in the character set;

c, determining a refined character set corresponding to the first image based on the second confidence; and d, performing image processing on a sub image corresponding to the refined character set in the first image, to obtain a second image, and annotating to the second image with an annotation text comprising the refined character set;

wherein, act c comprises:

sorting a plurality of character sets in a descending order of the second confidence; and determining the first N character sets in the order as refined character sets corresponding to the first image, N being a natural number.

* * * * *